(12) United States Patent
Ghule et al.

(10) Patent No.: US 9,960,719 B1
(45) Date of Patent: May 1, 2018

(54) VARIABLE FREQUENCY ELECTROSTATIC DRIVE

(71) Applicant: Wisconsin Alumni Research Foundation, Madison, WI (US)

(72) Inventors: Aditya N. Ghule, Madison, WI (US); Baoyun Ge, Madison, WI (US); Daniel Colin Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days. days.

(21) Appl. No.: 15/453,347

(22) Filed: Mar. 8, 2017

(51) Int. Cl.
*H01L 41/04* (2006.01)
*H02P 21/00* (2016.01)
*H02P 6/08* (2016.01)
*H02N 1/00* (2006.01)

(52) U.S. Cl.
CPC .............. *H02P 21/50* (2016.02); *H02N 1/004* (2013.01); *H02P 6/085* (2013.01)

(58) Field of Classification Search
CPC ................................ H02P 6/085; H02P 21/50
USPC ........................................................ 318/116
See application file for complete search history.

(56) References Cited

U.S. PATENT DOCUMENTS

| | | | |
|---|---|---|---|
| 2010/0237821 A1* | 9/2010 | Kitanaka ................. | H02P 21/05 318/702 |
| 2011/0062908 A1* | 3/2011 | Kitanaka ................. | H02P 21/22 318/400.22 |
| 2013/0043762 A1 | 2/2013 | Ludois et al. | |
| 2013/0106317 A1 | 5/2013 | Ludois | |
| 2014/0049197 A1* | 2/2014 | Kitanaka ................. | H02P 21/04 318/400.3 |
| 2014/0197710 A1 | 7/2014 | Ludois et al. | |
| 2015/0255209 A1 | 9/2015 | Ludois | |
| 2016/0028328 A1 | 1/2016 | Ludois | |
| 2016/0099663 A1 | 4/2016 | Petrowsky et al. | |
| 2016/0181954 A1* | 6/2016 | Satou ...................... | H02P 21/22 318/400.02 |
| 2016/0211775 A1 | 7/2016 | Ge et al. | |
| 2016/0329780 A1 | 11/2016 | Reed et al. | |
| 2016/0344306 A1 | 11/2016 | Ge et al. | |
| 2017/0047161 A1 | 2/2017 | Ludois et al. | |

* cited by examiner

*Primary Examiner* — Erick Glass
(74) *Attorney, Agent, or Firm* — Boyle Fredrickson, S.C.

(57) ABSTRACT

A variable speed drive for an electrostatic motor provides feedback control by conversion of measured current phases provided to the motor into a vector in a rotating rotor framework. This vector is used for evaluating corrective voltages and then reconverted to a non-rotating framework for application to the motor electrodes. Current-source drive circuits provide current stabilized outputs making such sophisticated control tractable.

20 Claims, 4 Drawing Sheets

VARIABLE FREQUENCY ELECTROSTATIC DRIVE

STATEMENT REGARDING FEDERALLY SPONSORED RESEARCH OR DEVELOPMENT

This invention was made with government support under 1452230 awarded by the National Science Foundation. The government has certain rights in the invention.

CROSS-REFERENCE TO RELATED APPLICATIONS

--

BACKGROUND OF THE INVENTION

The present invention relates to electrostatic motors and in particular to a drive providing electrical power to an electrostatic motor.

Electrostatic motors operate by exploiting forces generated by electrical fields on a respective stator and rotor, for example, as established on opposed plates on the stator and rotor. Electrostatic motors may be distinguished from conventional electromagnetic motors which exploit forces generated by interacting magnetic fields generated by the stator and rotor, for example, generated by current-carrying electrical coils or a permanent magnet.

Synchronous electrostatic motors are a class of electrostatic motors that provide a rotor presenting a substantially static electrical polarization which causes the rotor to rotate synchronously with a rotating electrostatic field generated by the stator. The stator generates this rotating electrostatic field by applying different phases of a periodic voltage to a set of circumferentially or axially displaced electrodes.

Electrical power to the stator, producing the desired rotating electrostatic field, may be generated, for example, by means of a high-voltage, three-phase, sinusoidal power from a generator applied to appropriately phased stator electrodes. Electrical power may also be synthesized by a step approximation or by pulse width modulation synthesis using high-voltage transistors to switch different polarities of electrical voltage among the stator electrodes. Current methods of controlling electrostatic motors provide relatively primitive control of torque and speed resulting in unnecessary power consumption or unutilized capability.

SUMMARY OF THE INVENTION

The present inventors have developed an electrical drive for an electrostatic motor that can tailor the stator voltages precisely to the rotor position to provide greatly enhanced electrostatic motor control. Current-source drivers are used to adapt the field control transformation techniques of electromagnetic motors to the electrostatic domain. The novel saliency of an electrostatic motor is modeled to provide for improved characterization of the necessary current vector angles for efficient production of torque. This control strategy utilizes a reference frame transformation to continuously monitor and position the relative magnitudes and angles of electrical quantities for precise torque modulation and motion control. Prior techniques for electrostatic motors were unable to extract maximum torque per volt or field oriented control in dynamic variable speed situations.

Specifically, one embodiment of the invention provides a variable speed drive for an electrostatic motor. The variable speed drive includes a set of current-source drives adapted to connect to the multiple field electrodes of the electrostatic motor and a rotor position detector. A d-q transformation circuit receives a position signal from the rotor position detector and measures of the outputs of the independent current drives to develop a measured d-q vectors (being a transformation to the rotating stator framework described below), and an input receives the desired d-q vectors. A comparison circuit provides an error vector based on the measured d-q vectors and desired d-q vectors. The comparison circuit may scale the d-q error vector by a regulator gain and this scaled d-q error is then provided to an ABC transformation circuit (reversing the d-q transformation) receiving the position signal and producing an output based on the error vector to develop a set of electrode signals provided to the current-source drives for driving the stator electrodes.

It is thus a feature of at least one embodiment of the invention to provide for sophisticated control of electrostatic motors, for example, including torque and speed control, by implementing field control methodology into the electrostatic framework. Current-source drives, capable of modulating ampere-seconds to the electrostatic machine based on a received command, permits tractable implementation of d-q control with simplified feedback loops.

The current-source drives may provide a set of electrical switches in series with a current-source implemented by an inductance on the DC side serving to provide a stiff current that may be modulated into the stator electrodes.

It is thus a feature of at least one embodiment of the invention to provide a robust current-source drive using the current regulating/energy storage properties of inductances on the AC side to manage current demand present in operating electrostatic motors.

The current-source drives may include a multi-phase H-bridge of electrical switches receiving current from an inductance operating to regulate current flow.

It is thus a feature of at least one embodiment of the invention to make use of conventional bridge circuitry used for electrical control to provide a flexible synthesis of arbitrary waveforms in the current-source drives.

The current regulating inductance may be part of a multiphase transformer on the AC side and the multiphase H-bridge of electrical switches may provide current to a multiphase transformer.

It is thus a feature of at least one embodiment of the invention to obtain the needed current-regulating inductance as part of a transformer that can step up voltage presented to the electrostatic motor allowing the semiconductor devices of the H-bridge to operate at preferred lower voltages.

The current-source drive may provide for a controller controlling switching the electrical switches of the multiphase H-bridge according to a sensed current output and sensed voltage output of the multiphase transformer.

It is thus a feature of at least one embodiment of the invention to permit the simultaneous use of current and voltage feedback to implement responsive current-source drives needed for variable speed control in a circuit having a transformer interposed between the H-bridge and the electrostatic motor.

The variable speed drive may include an input circuit generating the desired d-q vector based on a received command selected from the commands of torque and speed to control current applied to the stator electrodes.

It is thus a feature of at least one embodiment of the invention to provide a general system that may receive voltage, current, position, torque, speed or other types of commands by converting those commands into a vector in d-q space.

The input circuit may select an angle for the desired d-q vector between the d- and q-motor axes as a function of coupling capacitance between a rotor electrode and a stator electrode and a coupling capacitance between two stator electrodes.

It is thus a feature of at least one embodiment of the invention to provide a modeling of a salient pole electrostatic motor that considers inter-capacitive coupling of the motor components affecting an ideal phase of the stator voltage vector with respect to rotor position.

The input circuit selects an angle for the desired d-q voltage vector between the d- and q-motor axes according to the formula:

$$\gamma_{max} = -a\sin\left(\frac{C_{1mf}V_{fd} \pm \sqrt{C_{1mf}^2 V_{fd}^2 + 8C_{2s}^2 V_s^2}}{4C_{2s}V_s}\right) \pm 5\%.$$

where:

$\gamma_{max}$ is an optimum angle between the desired d-q voltage vector and the q-axis, normally a constant value for steady-state motor operation;

$C_{1mf}$ is the magnitude of the fundamental of the coupling capacitance between any one of the stator terminals (a, b, c) to any one of the rotor terminals (Vf+ or Vf−);

$C_{2s}$ is the magnitude of the second harmonic of the coupling capacitance between any two stator terminals (a-b, b-c, c-a);

$V_{fd}$ is the magnitude of the do rotor voltage; and $V_s$ is the magnitude of the fundamental of the stator voltage.

It is thus a feature of at least one embodiment of the invention to provide a drive that can select an optimal phase angle of the applied stator voltages for maximum torque per volt in a motor with field and saliency torque.

Alternatively, the value of $\gamma_{max}$ may be selected from the group consisting of 0 and π (each ±5%) for a motor with field torque only and π/4, −π/4, 3π/4, −3π/4 (each ±5%) for a motor with saliency torque only.

These particular features and advantages may apply to only some embodiments falling within the claims and thus do not define the scope of the invention.

DETAILED DESCRIPTION OF THE PREFERRED EMBODIMENT

Figure 1:
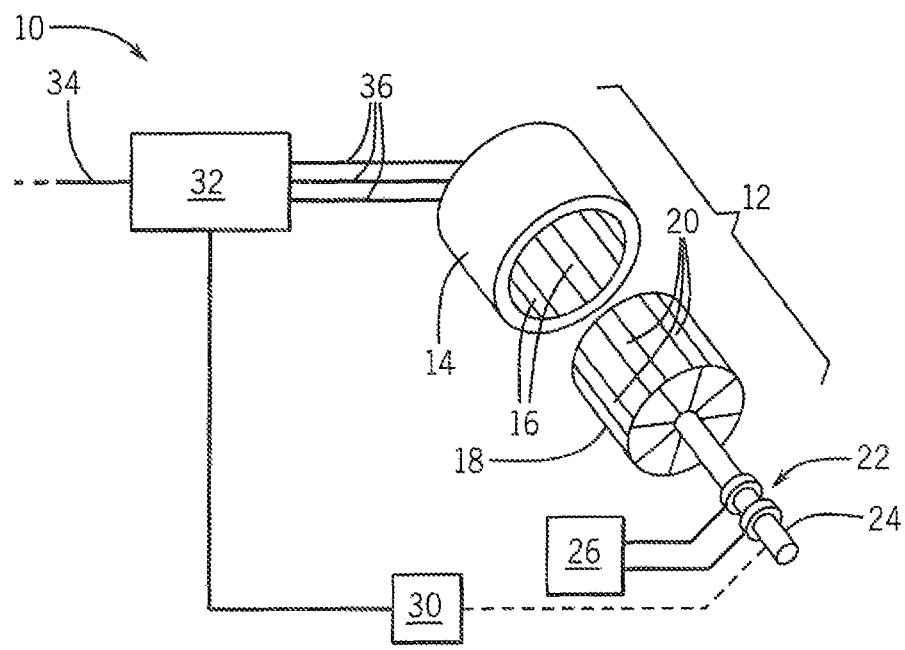
FIG. 1 is a simplified exploded diagram of the drive system of the present invention used with a "nested cylinder" type motor design.

Referring now to FIG. 1, an electrostatic drive system 10 may include an electrostatic motor 12 having a generally cylindrical stator 14 supporting internal, longitudinally extending and circumferentially displaced stator electrodes 16. Fitting within the stator 14 is a rotor 18 having corresponding, outwardly exposed longitudinally extending and circumferentially displaced rotor electrodes 20 interacting with the stator electrodes 16 when the rotor 18 is positioned within the stator 14.

Figure 2:
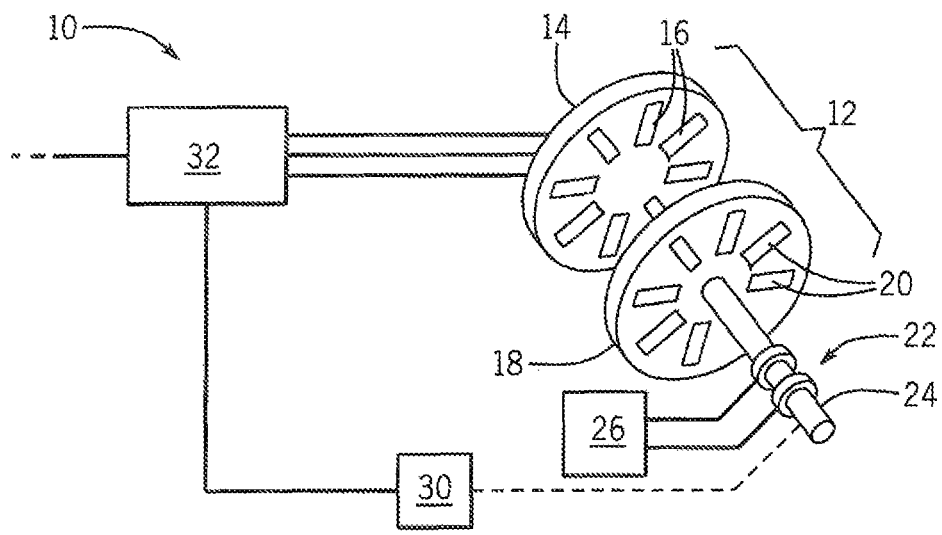
FIG. 2 is a figure similar to FIG. 1 of the drive system of the present invention used with an "opposed plate" type design.

In an alternative design, shown in FIG. 2, the stator 14 may be one or more disk-shaped plates having radially extending, circumferentially displaced stator electrodes 16 interacting with corresponding radially extending, circumferentially displaced rotor electrodes 20 on a corresponding disk-shaped rotor 18 positioned adjacent to the disk-shaped stator 14 for interaction therewith.

Motors of this type are described in U.S. Pat. No. 9,184,676 as well as applications 2016/0211775 and 2016/0344306 all assigned to the assignee of the present invention and incorporated by reference.

In both of the designs of FIGS. 1 and 2, the rotors 18 may be supported for rotation on driveshafts 24 extending axially outward for the extraction of mechanical work. A slip ring or brushless type of power transfer (capacitive or inductive) system 22 attached to the driveshaft 24 allows electricity from a stationary rotor power supply 26 to be conducted to the rotating rotor electrodes 20 through terminals Vf+ and Vf− as is generally understood in the art to provide an electrostatic polarization of the rotor 18.

The electrostatic drive systems 10 provide for position monitoring of the rotors 18 with respect to a stationary stator 14 through the use of a position detection system 30. The position detection system 30 may be a resolver or encoder mechanically attached to the driveshaft 24 to provide a signal uniquely identifying the location of the rotor 18 with respect to the stator 14 in a range of 0 to 2 π radians. Alternatively, similar measurements may be provided by other position sensors or estimators well known in the art including, for example, "back MMF" (magneto motive force) sensors which equate changes in the back MMF sensed at the stator electrodes 16 to a rotational position, or "saliency tracking" sensors which inject a high-frequency signal, for example, into the output of the rotor power supply 26 and detect changes in that signal as coupled to the stator 14 caused by the variations in electrical coupling between the stator and rotor caused by motor saliency. Each of these alternatives will be termed a position determination system 30.

In both the designs of FIGS. 1 and 2, a variable speed drive 32 of the present invention may provide for controlled application of power to the stator electrodes 16 of the stator 14 based on the position signal generated by the position detection system 30. In this regard, the variable speed drive 32 may receive a command signal 34, for example, speed or torque or other related quantity, and determine the proper variable currents to be applied to the stator electrodes 16 necessary to provide operation of the electrostatic motor 12 in conformance with that command signal 34. As such, the output of the variable speed drive 32 will provide multiple phases 36 (also designated A,B,C, for a three phase embodiment) associated with different stator electrodes 16 providing sinusoidal or other continuously varying signals to those stator electrodes 16 necessary to maximize motor performance.

Figure 3:
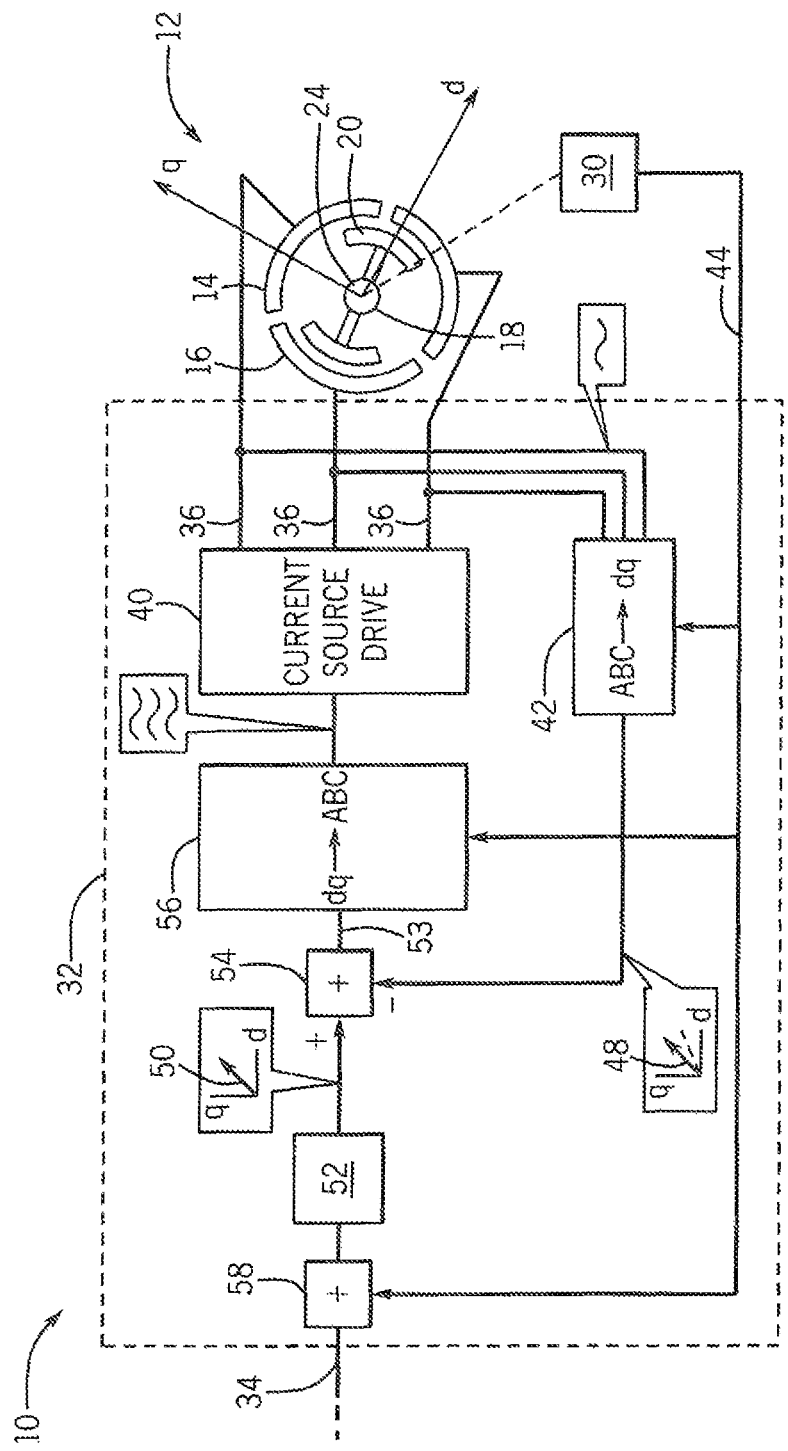
FIG. 3 is a detailed block diagram of the principal control elements of the drive of FIGS. 1 and 2 of the outputs connected to electrodes of a simplified three-phase electrostatic motor providing current-source outputs for each electrode.

Referring now to FIG. 3, the instantaneous values of the output phases 36 required for a given command signal 34 can be a function of not only the command signal 34 but also rotor position and the characteristics of the motor 12. This processing necessary to generate the output phases 36 may be simplified through a coordinate transformation known in conventional electromagnetic motors in which constantly varying multiple phases 36 are mapped to a reference frame rotating with the motor rotor 18. This reference frame is termed the d-q reference frame where the d axis (the direct axis) is aligned with the positive electrode on the rotor 20 and the q axis (the quadrature axis) is positioned at 90 degrees with respect to the d axis. Viewed in this reference frame, the complexity of the waveforms at the multiple phases 36 (termed A, B, C, for an example, in a three-phase system) devolves to a single vector that is largely unvarying for steady-state operation of the motor 12. Details of this transformation in the context of electromagnetic machines are described, for example, at D. W. Novotny and T. A. Lipo, "Vector Control and Dynamics of AC Drives," 1st edition, Oxford University Press, 1996 (including pages 88-102) with the underlying mathematics also applicable to the present invention.

Using this transformation, the present invention provides a feedback control of a current-source drive 40 having phases 36 connected to each of the stator electrodes 16. In this regard, current and in some cases voltages from each of these phases 36 are measured and these measurements received by ABC-dq transformation circuit 42. The ABC-dq transformation circuit 42 also receives a position signal 44 from the position detection system 30 to convert the received phase signals (A, B, C) into a vector in d-q space termed the "measured" d-q vector 48.

The input command signal 34 will be converted to a similar "desired" d-q vector 50 by input conversion circuit 52. This desired d-q vector 50 will generally have a different angle and different magnitude than the measured d-q vector 48 when the electrostatic motor 12 is not operating in steady-state. When the input command signal 34 is a torque value, the magnitude of the desired d-q vector 50 will be proportional to the desired torque and the ideal angle with respect to the q-axis will depend on the type of motor 12. For a non-salient machine, the angle will simply be zero degrees (a desired d-q vector 50 aligned with the q-axis); however, for a salient machine this calculation will be more complex as will be discussed below. The ideal angle is one that provides maximum torque per voltage thereby reducing motor losses.

Once the desired d-q vector 50 is determined, it is compared it to the measured d-q vector 48 to produce an update value 53 at comparison block 54 which controls the current-source is 40. In the simplest case, update value 53 is simply a difference between the desired d-q vector 50 and the measured d-q vector 48; however, alternatively, this difference may be further processed, for example, under proportional/integral/derivative type control strategies in which the update value 53 is a weighted combination of the difference value, a time running integration of this difference value, and a derivative of this difference value. It will also be appreciated that other control strategies may be introduced in comparison at block 54 including feedback and/or feedforward of other measured variables derived from the motor 12.

Referring still to FIG. 3, the correction value 53 is then provided to an dq-ABC transformation circuit 56 operating in the reverse direction as the ABC-dq transformation circuit 42 (as inverse transforms) to change the correction value 53, being a vector in d-q space, phases 36 in a nonrotating frame.

This feedback control process, traversing the loop of ABC-dq transformation circuit 42 and dq-ABC transformation circuit 56, continues during operation of the motor 12.

When the command signal 34 is a different value, for example, a desired rotational speed (e.g., RPM), an additional, optional feedback loop may be incorporated, for example, using the position signal 44 to deduce speed and using a difference between the desired RPM of the command signal 34 and the deduced RPM, at optional comparison block 58, to create a torque value that may then be treated as discussed above with respect to the torque signal. Other input signals can also be handled in this manner, and in this regard and the invention contemplates that programmable command signals 34 may be used, for example, for soft start and stop of the motor 12 as well as different regimes at different motor RPMs or operating conditions.

The ABC-dq transformation circuit 42, input conversion circuit 52, comparison block 54, and dq-ABC transformation circuit 56 may be implemented by discrete circuitry or preferably by a high-speed computer processor executing a program stored in non-transient computer memory for example as firmware and employing analog-to-digital converters to operate in a digital domain.

Figure 4:
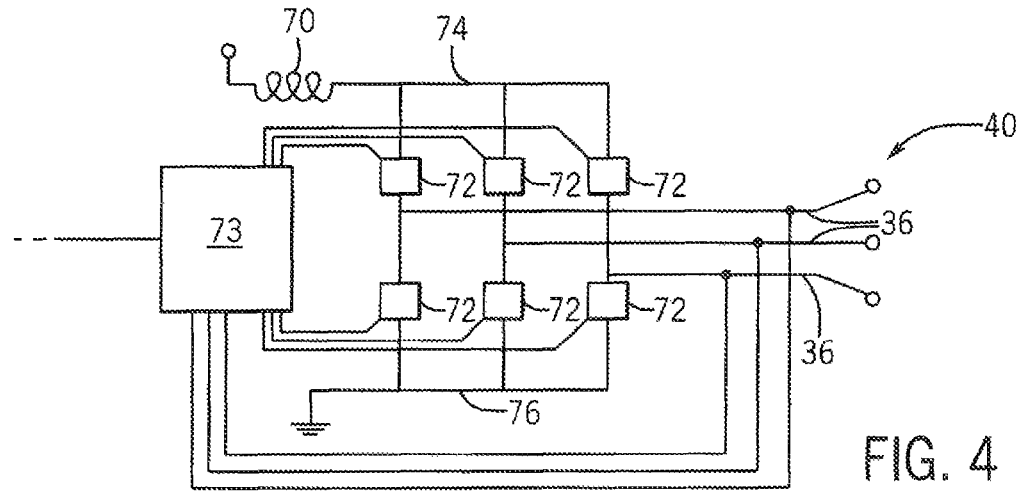
FIG. 4 is a first embodiment of the current-source drive of FIG. 3 employing a single current regulating inductance.
Figure 5:
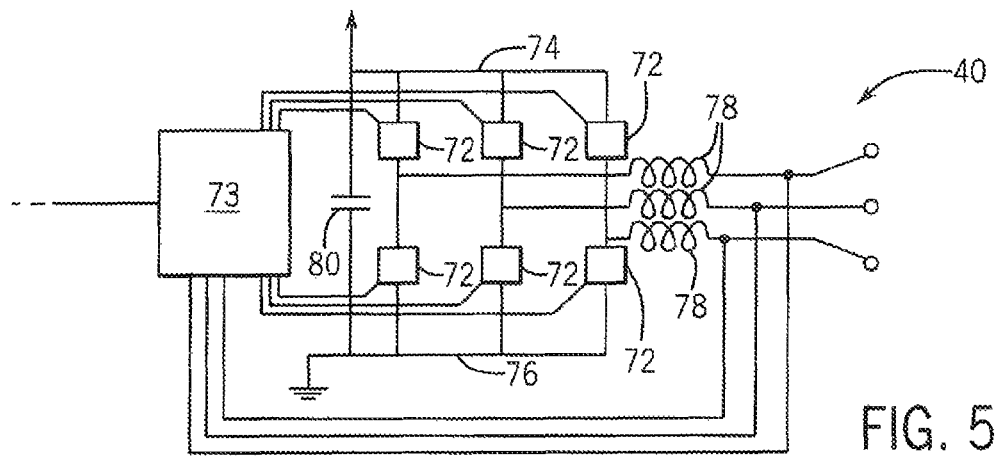
FIG. 5 is a second embodiment of the current-source drive a FIG. 3 including three independent current-regulating inductances.

Referring now to FIGS. 4 and 5, practical implication of sophisticated field control of an electrostatic motor is enabled by the ability to generate "stiff" current output signals at the power levels needed to drive electrostatic motor 12, that is, outputs that can provide open-loop current control in the face of rapidly fluctuating voltages at the multiple phases 36 caused by changes in capacitive coupling with rotation of the motor 12. The invention contemplates that the electrostatic motors 12 will operate at powers in excess of 10 watts, typically in excess of 100 watts, and desirably in excess of 1000 watts.

The necessary "current-source" outputs may be produced through the use of one or more series inductive elements exploiting a feature of inductance that resists changes in the current flowing through the inductor, a feature of the buildup of self-induced energy within the magnetic field of the inductor. The present invention recognizes that this property can be enlisted to provide sufficient output current stability to synthesized current waveforms without unduly preventing dynamic control of that current necessary for "field control" of the motor or variable speed capabilities. In this regard the inductance must be of a size to provide current regulation (and hence energy storage) at the expected motor power levels providing, for example, for the control of current output to the motor to within 25 percent of the command value controlling the semiconductor switches, and typically within 10 percent, and desirably within five percent.

In a first such implementation, a current regulating inductor 70 provides current to a set of solid-state switches 72, for example, transistors such as MOSFET transistors, receiving ABC current values from the switching logic circuit 73. The solid-state switches 72, for example, are configured in an H-bridge where each of the phases 36 connects to a junction between a pair of series-connected switches 72, the pair in turn spanning a positive power rail 74 and a negative power rail 76 providing a direct current stabilized by inductor 70. Rudimentary use of this circuit can produce square wave outputs; however the present invention contemplates that the phases 36 produced are continuous waveforms of arbitrary shape and frequency dictated by the control algorithm. Accordingly the switches 72 will receive control signals determining their switch state that are pulse-width modulated (or modulated by a similar modulation technique including pulse-density modulation etc.). In pulse width modulation, an on-time of the switch 72 is varied to determine the average current value output through the phase 36. In such modulation, the switches 72 are operated in switched mode (either on or off) for energy efficiency, but switch at high rates to produce continuous waveforms (e.g., sine waves of different frequencies) smoothed by the capacitance of the electrostatic motor 12 In pulse width modulation, the switching speed of the semiconductors is at many times the fundamental frequency of the waveform of phases 36 and typically more than 10-20 times that frequency.

Referring now to FIG. 5, an alternative version of the circuit shown in FIG. 4 breaks the inductor 70 into three inductor components 78 placed after the connection of the phases 36 to the junctions between switching switches 72 of the H-bridge with one inductor component 78 placed in the series with each of the phases 36. In this case, the voltage of the power rails 74 and 76 feeding the H-bridge may be stabilized by a capacitor 80 extending between those rails.

Figure 6:
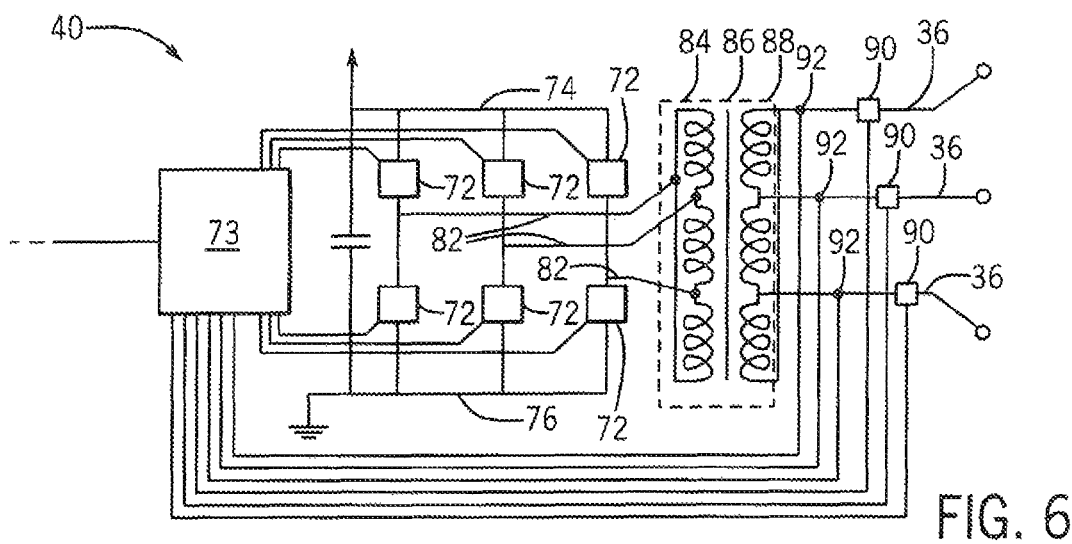
FIG. 6 is a third embodiment of the current-source drive of FIG. 2 incorporating a step up transformer for minimizing the drop voltage across the switching semiconductors and using leakage inductance of the transformer for current regulation.

Referring now to FIG. 6, a third topology of the current-source drive 40 provides an advantage of allowing the switches 72 to operate at a lower, preferred voltage range than would be optimum for the voltage for the phases 36. In this circuit, precursor phases 82 are produced at the junctions of each pair of switches 72 of the H-bridge (otherwise identical to the H-bridge of FIG. 4) and each of the precursor phases 82 connect to a corresponding phase of a multi-phase primary 84 of a step up transformer 86. The step up transformer 86 has a number of primary phases equal to the number of phases 36 of the motor (three phases are shown in FIG. 6 comporting with a standard three phase motor).

The secondary winding 88 of the transformer 86 has an equal number of taps as the input, but a greater number of turns, substantially increasing the voltage applied to the phases 36 in comparison to the voltage of the precursor phases 82. The step up in voltage may be at least 3, but typically no more than 100.

Leakage flux from the transformer 86 provides the necessary inductive storage of energy to promote current regulation in each of the phases 36. In this embodiment, the output of each of the phases 36 may be sensed by a current sensor 90 and at a voltage phase 92 so that separate current and voltage measurements may be made and separate current and voltage feedback loops may be used to control the switches 72 for improved fidelity and stability. In this case, for example, current feedback may be used to provide d-q cross coupling decoupling.

Figure 7:
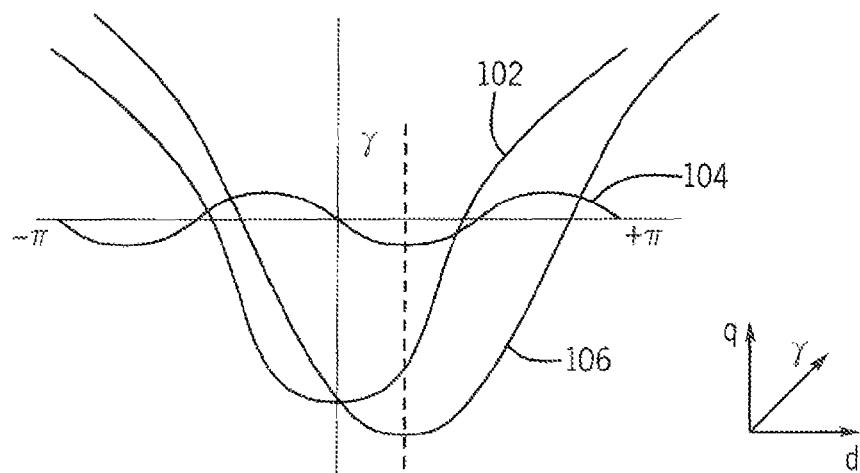
FIG. 7 is a plot of torque versus angle of the stator field relative to the rotor as informed by the present invention's abstraction of torque into field and elastance torques showing determination of maximum torque per volt, this plot positioned adjacent to a vector diagram depicting the angle of the stator field in a d-q reference frame.
Figure 8:
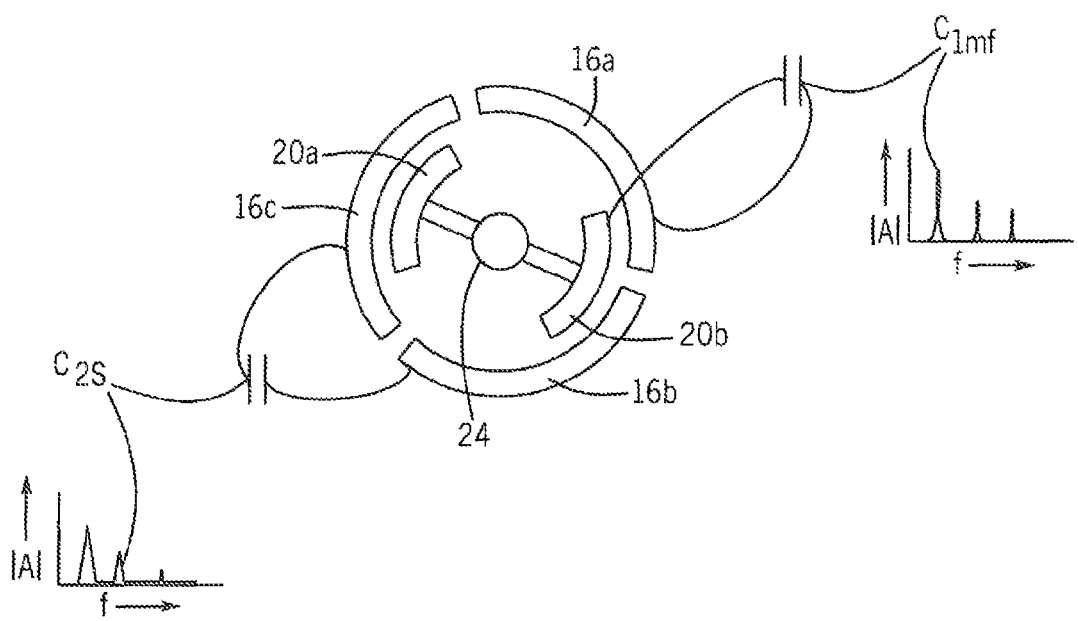
FIG. 8 is a diagrammatic representation of terms used to determine the angle relationship of FIG. 7

Referring now to FIG. 7, as noted above, for a salient machine having both field and saliency torques, being an electrostatic motor 12 having significant perturbations in rotor/stator capacitive coupling with rotation, the optimum angle of the input command signal may not be aligned along the q vector in d-q space but displaced slightly therefrom based on the construction of the motor. Such motors provide for two different torque features including a primary field torque feature 102 and a secondary elastance torque feature 104 each varying as a function of the angle from the q-axis. The combination of these torques indicated by curve 106 provides the net torque of the motor 12 and has been modeled by the present inventors to be maximized according to the following formula:

$$\gamma_{max} = -\text{asin}\left(\frac{C_{1mf}V_{fd} \pm \sqrt{C_{1mf}^2 V_{fd}^2 + 8C_{2s}^2 V_s^2}}{4C_{2s}V_s}\right) \pm 5\%.$$

where:

asin is the arcsin;

$\gamma_{max}$ is an optimum angle magnitude between the desired d-q vector and the q-axis of the command signal 34, normally a constant value for steady-state motor operation;

$C_{1mf}$ is the magnitude of the fundamental of the coupling capacitance between any one of the stator terminals (a, b, c) to any one of the rotor terminals (Vf+ or Vf−);

$C_{2s}$ is the magnitude of the second harmonic of the coupling capacitance between any two stator terminals (a-b, b-c, c-a);

$V_{fd}$ is the magnitude of the dc rotor voltage; and $V_s$ is the magnitude of the fundamental of the stator voltage.

Because the values of $C_{1mf}$, $C_{2s}$, and $V_{fd}$ typically vary as a function of rotor position they are characterized by the frequency spectrums of this periodic signal looking either at the fundamental or second harmonic as indicated. The value of $V_s$ is normally, but need not be, constant.

For motors that have only field torque, the value of $\gamma_{max}$ may be selected from the group consisting of 0 and π (each ±5%) for the motors with only saliency torque the value of $\gamma_{max}$ may be selected from the group of π/4, −π/4, 3π/4, −3π/4 (each ±5%).

The term ABC is intended to represent an arbitrary number of phases not just three phases as context would require.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. Although the stator and rotors are shown as disks in the disclosed embodiments, there is no requirement that the stator or rotor be in a disk form.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A variable speed drive for an electrostatic motor of a type having a stator with multiple stator electrodes adapted to generate a rotating stator electric field vector about an axis and a rotor having multiple rotor electrodes providing a rotor electric field interacting with the rotating electric field primarily by electrostatic forces rather than magnetic forces, the variable speed drive comprising:
   a set of current-source drives adapted to connect to the multiple stator electrodes wherein the current-source drives provide a set of electrical switches in series with a current source implemented by an inductance serving to regulate current to the stator electrodes;
   a rotor position determination system;
   an ABC-dq transformation circuit receiving a position signal from the rotor position detector and measures of outputs of the current-source drives to develop a measured d-q vector;
   an input for receiving the desired d-q vector;
   a comparison circuit providing an error vector based on the measured d-q vector and desired d-q vector; and
   a dq-ABC transformation circuit receiving the position signal and providing an output based on the error vector to develop a set of electrode signals provided to the current-source drives for driving the stator electrodes of the electrostatic motor.

2. The variable speed drive of claim 1 wherein the an inductance regulates current to the stator electrodes to within 25 percent of electrode signals provided to the electrical switches for a motor of at least 10 watts.

3. The variable speed drive of claim 2 wherein the current-source drives include a multi-phase H-bridge of electrical switches receiving current from an inductance operating to regulate current flow.

4. The variable speed drive of claim 2 wherein the current-source drive is a multiphase H-bridge of electrical switches and includes current to three inductances operating to regulate current flow to respective stator plates.

5. The variable speed drive of claim 2 wherein the current-source drive includes a multiphase H-bridge of electrical switches providing current to a multiphase transformer system providing a current regulating inductance.

6. The variable speed drive of claim 5 wherein the current-source drive provides for a controller controlling switching the electrical switches of the multiphase H-bridge according to a sensed current output and sensed voltage output of the multiphase transformer.

7. The variable speed drive of claim 1 further including an input circuit generating the desired d-q vector based on a received command selected from the group of commands of torque and speed to control current applied to the stator electrodes.

8. The variable speed drive of claim 7 wherein the input circuit selects an angle for the desired d-q vector between the d- and q-motor axes as a function of coupling capacitance between a rotor terminal and a stator terminal and a coupling capacitance between two stator terminals.

9. A variable speed drive for an electrostatic motor of a type having a stator with multiple stator electrodes adapted to generate a rotating stator electric field vector about an axis and a rotor having multiple rotor electrode providing a rotor electric field interacting with the rotating electric field primarily by electrostatic forces rather than magnetic forces, the variable speed drive comprising:
   a set of current-source drives adapted to connect to the multiple stator electrodes;
   a rotor position determination system;
   an ABC-dq transformation circuit receiving a position signal from the rotor position detector and measures of outputs of the current-source drives to develop a measured d-q vector;
   an input for receiving the desired d-vector;
   a comparison circuit providing an error vector based on the measured d-q vector and desired d-q vector; and
   a dq-ABC transformation circuit receiving the position signal and providing an output based on the error vector to develop a set of electrode signals provided to the current-source drives for driving the stator electrodes;
   wherein the input circuit selects an angle for the desired d-q vector between the d- and q-motor axes according to a formula:

$$\gamma_{max} = -a\sin\left(\frac{C_{1mf}V_{fd} \pm \sqrt{C_{1mf}^2 V_{fd}^2 + 8C_{2s}^2 V_s^2}}{4C_{2s}V_s}\right) \pm 5\%.$$

where:
$\gamma_{max}$ is an optimum angle magnitude between the desired d-q voltage vector and the q-axis;
$C_{1mf}$ is a magnitude of a fundamental of a coupling capacitance between any one of the stator terminals to any one of the rotor terminals;
$C_{2s}$ is a magnitude of a second harmonic of a coupling capacitance between any two stator terminals;
$V_{fd}$ is a magnitude of the dc rotor voltage; and
$V_s$ is the magnitude of the fundamental of the stator voltage.

10. The variable speed drive of claim 1 wherein the input circuit selects an angle $\gamma_{max}$ for the desired d-q vector between the d- and q-motor axes from the group consisting of 0 and π (each ±5%).

11. The variable speed drive of claim 1 wherein the input circuit selects an angle $\gamma_{max}$ for the desired d-q vector between the d- and q-motor axes from the group consisting of π/4, −π/4, 3π/4, −3π/4 (each ±5%).

12. The variable speed drive of claim 1 wherein the position detection system is selected from the group consisting of a position encoder, an MMF sensor, and a saliency or MMF tracking sensor using injected high-frequency current.

13. The variable speed drive of claim 1 wherein the stator includes three electrically independent sets of electrodes in equal angles about the axis, the electrodes of each set joined electrically to a common terminal.

14. The variable speed drive of claim 1 further including an electrostatic motor of a type having a stator with multiple stator electrodes receiving output from the current-source drives and adapted to generate a rotating stator electric field vector about the axis and a rotor having multiple rotor electrodes providing a rotor electric field interacting with the rotating electric field primarily by electrostatic forces rather than magnetic forces.

15. The variable speed drive of claim 14 further including an insulating liquid contained to be present between the stator electrodes and rotor electrodes.

16. A method of providing variable speed control of an electrostatic motor of a type having a stator with multiple stator electrodes adapted to generate a rotating stator electric field vector about an axis and a rotor having multiple rotor electrodes providing a rotor electric field interacting with the rotating electric field primarily by electrostatic forces rather than magnetic forces, comprising the steps of:
  providing a set of current-source drives for providing current to the stator electrodes wherein the current-source drives provide a set of electrical switches in series with a current source implemented by an inductance serving to regulate current to the stator electrodes;
  receiving a position signal from the rotor position detector and measures of outputs of the current-source drives to develop a measured d-q vector;
  receiving a desired d-q vector and comparing it to the measured d-q vector to produce an error vector; and
  transforming the error vector to produce a set of outputs provided to the current-source drives for driving the stator electrodes of the electrostatic motor.

17. The method of claim 16 further including the step of generating the desired d-q current vector based on a received command selected from commands selected from the group consisting of torque and speed to control current applied to the stator electrodes.

18. The method of claim 17 wherein the desired d-q voltage vector has an angle between the d- and q-motor axes that is a function of coupling capacitance between a rotor electrode and a stator electrode and a coupling capacitance between two stator electrodes.

19. The method of claim 18 wherein the torque input circuit selects an angle for the desired d-q voltage vector between the d- and q-motor axes according to a formula:

$$\gamma_{max} = -\frac{C_{1mf}V_{fd} \pm \sqrt{C_{1mf}^2 V_{fd}^2 + 8C_{2s}^2 V_s^2}}{4C_{2s}V_s} \pm 5\%$$

where:
$\gamma_{max}$ is an optimum angle between the desired d-q vector and the q-axis;
$C_{1mf}$ is a magnitude of a fundamental of a coupling capacitance between any one of the stator terminals to any one of the rotor terminals;
$C_{2s}$ is a magnitude of a second harmonic of a coupling capacitance between any two stator terminals;
$V_{fd}$ is a magnitude of a dc rotor voltage; and
$V_s$ is the magnitude of the fundamental of the stator voltage.

20. The method of claim 16 wherein the position detection system is selected from the group consisting of a position encoder, an MMF sensor, and a saliency or MMF tracking sensor using injected high-frequency current.

* * * * *